US012799615B2

(12) United States Patent
Dentler et al.

(10) Patent No.: US 12,799,615 B2
(45) Date of Patent: Nov. 17, 2026

(54) METHOD FOR GENERATING THERMAL ENERGY AND CHEMICAL FEEDSTOCK BY MEANS OF ALUMINO-THERMAL REACTION

(71) Applicant: Energy 13 GmbH, Jena (DE)

(72) Inventors: Carsten Dentler, Bad Homburg (DE); Norbert Windhab, Hofheim/Taunus (DE)

(73) Assignee: Energy 13 GmbH, Jena (DE)

( * ) Notice: Subject to any disclaimer, the term of this patent is extended or adjusted under 35 U.S.C. 154(b) by 685 days.

(21) Appl. No.: 17/923,340

(22) PCT Filed: May 5, 2021

(86) PCT No.: PCT/EP2021/000059

§ 371 (c)(1),
(2) Date: Nov. 4, 2022

(87) PCT Pub. No.: WO2021/228429

PCT Pub. Date: Nov. 18, 2021

(65) Prior Publication Data

US 2023/0193493 A1 Jun. 22, 2023

(30) Foreign Application Priority Data

May 9, 2020 (DE) ..................... 10 2020 002 774.1

(51) Int. Cl.

*C01B 32/40* (2017.01)
*C01B 3/10* (2026.01)
*C25C 3/06* (2006.01)

(52) U.S. Cl.

CPC .................. *C25C 3/06* (2013.01); *C01B 3/10* (2013.01); *C01B 32/40* (2017.08); *C01B 2203/062* (2013.01)

(58) Field of Classification Search

CPC ............. C01B 32/40; C01B 3/08; C01B 3/10; C01B 2203/08; C01B 2203/84; C01B 2203/062; C01F 17/30; C01F 17/308

See application file for complete search history.

(56) References Cited

U.S. PATENT DOCUMENTS

| | | | | |
|---|---|---|---|---|
| 3,975,913 | A | 8/1976 | Erickson | |
| 2005/0279627 | A1 | 12/2005 | Edwards et al. | |
| 2007/0056210 | A1* | 3/2007 | Schmidt .................... | C01B 3/08 44/252 |
| 2010/0028255 | A1 | 2/2010 | Hatoum | |
| 2011/0084487 | A1 | 4/2011 | Davidson | |
| 2012/0009119 | A1* | 1/2012 | Yampolsky ............... | C01B 3/10 422/162 |
| 2021/0164696 | A1 | 6/2021 | Flesch et al. | |

FOREIGN PATENT DOCUMENTS

| | | | |
|---|---|---|---|
| CN | 107758613 | A | 3/2018 |
| CN | 109795984 | A | 5/2019 |
| CN | 110734082 | A | 1/2020 |
| DE | 0656483 | C | 2/1938 |
| DE | 102018213018 | A1 | 2/2020 |
| EP | 1766105 | B1 | 8/2016 |
| WO | 2008/050350 | A2 | 5/2008 |
| WO | 2010/076802 | A9 | 9/2010 |
| WO | 2014/173991 | A1 | 10/2014 |

OTHER PUBLICATIONS

Cassayre, Laurent, et al. "Properties of low-temperature melting electrolytes for the aluminum electrolysis process: a review." Journal of Chemical & Engineering Data 55.11 (2010): 4549-4560.*
English machine translation of CN109795984 (2019).*
Dittrich, R., et al. "Understanding of interactions between pyrolysis gases and liquid aluminum and their impact on dross formation." Light metals 2017. Cham: Springer International Publishing, 2017. 1457-1464.*
English machine translation of CN107758613 (2017).*
International Search Report and Written Opinion received for PCT Patent Application No. PCT/EP2021/000059, mailed on Oct. 7, 2021, 22 pages (4 pages of English Translation and 18 pages of Original Document).
Shmelev et al., "Hydrogen generation by reaction of molten aluminum with water steam," International Journal of Hydrogen Energy, vol. 41, No. 33, Sep. 7, 2016, pp. 14562-14572.
Kobayashi et al., "Science and technology of ammonia combustion," Proceedings of the Combustion Institute, vol. 37, No. 1, Jan. 25, 2019, pp. 109-133.
Vlaskin et al., "An experimental aluminum-fueled power plant," Journal of Power Sources, vol. 196, No. 20, Jun. 13, 2011, pp. 8828-8835.

(Continued)

*Primary Examiner* — Richard M Rump
(74) *Attorney, Agent, or Firm* — Faegre Drinker Biddle & Reath LLP

(57) ABSTRACT

A process for generating thermal energy and basic chemicals having the following steps:

a) producing aluminum metal by fused-salt electrolysis in a fused-salt electrolysis plant,
b) using aluminum metal for the generation of thermal energy and of chemical basic materials selected from the group carbon monoxide or hydrogen, by bringing carbon dioxide and/or water or a mixture containing a compound containing nitrogen and hydrogen and carbon dioxide and/or water into contact with the aluminum metal and converting it in an aluminothermic reaction to aluminum oxide and carbon monoxide and/or hydrogen,
c) storage or chemical conversion of the carbon monoxide and/or hydrogen produced thereby,
d) storage of the thermal energy generated in the process or conversion into other forms of energy, and
e) recycling the aluminum oxide obtained in the process to the fused-salt electrolysis.

The process allows fused-salt electrolysis plants for aluminum production to be operated with regenerative energies of fluctuating output over time without having to shut down these plants. The process also allows energy generation to be coupled with the provision of basic chemicals that can be used in a closed-loop process.

19 Claims, No Drawings

(56) References Cited

OTHER PUBLICATIONS

International Preliminary Report on Patentability received for PCT Patent Application No. PCT/EP2021/000059, mailed on Nov. 15, 2022, 11 pages.

* cited by examiner

METHOD FOR GENERATING THERMAL ENERGY AND CHEMICAL FEEDSTOCK BY MEANS OF ALUMINO-THERMAL REACTION

CROSS-REFERENCE TO RELATED APPLICATIONS

This application is a National stage application (under 35 U.S.C. § 371) of PCT/EP2021/000059, filed May 5, 2021, which claims benefit of German Application No. 10 2020 002 774.1, filed May 9, 2020, both of which are incorporated herein by reference in their entirety.

The invention relates to a process for the combined production of thermal energy and basic chemicals by aluminothermic reduction of carbon dioxide and/or water vapor and optionally by additional reaction with compounds containing nitrogen and hydrogen, such as ammonia.

The process can be used to utilize and manage certain excess $CO_2$ released into the environment, both natural and anthropogenic, in the context of the combustion or other use of organically or mineral-bound carbon. The invention aims at the congruence of energy and material carrier in order to mitigate the often sunlight-, wind- as well as tide-dependent cyclicality and variability of both power generation based on renewable energy or resources and power storage. In addition, hydrogen and $CO_2$ are to be fed to material, electrical, and tractor uses through use in the syngas train.

Metal production is often integrated with different methods of energy management. Material as well as physical systems based on renewable energies must regionally also handle biomass production in the future and thus improve the nutrition of an increasing world population by intensifying existing agricultural areas or by increasing the productivity in the production of food under biomass production.

The material chemical strands of the world's food production today are predominantly factually fossil in nature. The underlying carbon sources are thereby technically almost arbitrarily switchable, biological production is sugar-, lipid- or protein-based and thus already dependent on energetic net influx, e.g. by applying the Haber-Bosch process to generate nitrogen sources for biological production.

The future of a pacified stabilized biosphere is renewable energy with de facto ban of thermal gasification of fossil fuels. On the other hand, the anthropogenic $CO_2$ production on all continents will continue to increase due to the internationally growing energy demand in the fields of chemistry, building materials (steel, concrete, mineral firing), heat and especially cold generation, transportation, telecommunications and, almost unnoticed increasingly, in data processing and food production with the corresponding irreversible land demand for this (deforestation, erosion). Massive development of known and new discovery of extractable oil and natural gas reserves let hardly any interest in the holistic production ban even in western dominated democracies, which from the cost advantage of a disappearing material economy is argumentative as a "green paradox", because the closer the ban the lower the prices with exuberant turnover.

This results reciprocally in a demand for highly effective large-scale industrial $CO_2$ absorption and for a need for compensation in the near future for industries under the greatest strategic cost pressure, such as the steel, building materials, transport and aviation industries, with in part naturally decentralized-global location security, despite current static population considerations and frequent regional conflicts against the background of potential, massive migration conflicts and disasters, also triggered by climate change and striving for natural resources.

Various measures are envisaged to meet this requirement:

Use of material single use strands of fossil utilization with special role and proven compensation of the resulting anthropogenic $CO_2$ input, systematic cyclicity of energy production from renewable sources e.g. in the day-night cycle of photovoltaics, solar thermal energy, wind energy and the Earth Moon cycle of tidal power plants, separation of storage capacity into energy storage and transport forms with a shift of energy to hydrogen, which itself contributes dramatically to $CO_2$ input into the environment or biosphere or atmosphere through the direct use of synthesis gas with its endothermic reforming reactions the latter also applies to the dark reaction of photosynthesis, since the tree or green plant is very well adapted to the sustainable biosphere situation for—slow—proliferation, but it is not optimized or optimizable as $CO_2$ storage. Very fast-growing trees are particularly poorly adapted to new climate situations and weather extremes; huge tree planting campaigns are locally possible and desirable as microeconomy catalysts, but with increases in extreme weather, soil scarcity, and political instability, they carry significant cost-benefit as well as success risks.

Thus, the same picture emerges for both synthesis gas production and technical biotechnology. Both lead to a net $CO_2$ production with the exception of a few regions of the world where biotechnology and plant utilization for traction ethanol and power generation have been realized.

Hydrogen shows surprisingly low enthalpy in its "oxyhydrogen thermics" gas-gas and is also difficult to store. Material conversions tie up specific plant investments. For example, the low phase triple point necessitates massive cooling and heat exchanger operations, which are conceivable in the economic balance.

Aluminum is to be mentioned as a metal which is storage-stable, process-technically and in the recirculation cycle for a molar but also weight-specific energy storage. In fact, aluminum is produced exclusively by melt electrolysis. Significantly, industrial aluminum electrolysis in "optimal" operation itself becomes an emitter of greenhouse gases through the deliberate sacrifice of the carbon electrode by the production of CO and $CO_2$. New processes, such as the Elysis™ process report here an additional significant paradigm shift for the global use of the process.

It is known that during the formation of alumina by oxidation of aluminum, an extraordinarily high heat of reaction is released. The heat of formation of aluminum oxide is −1669.8 kJ/mol, i.e. −835 kJ per mole of aluminum used. Aluminum is used as a technical metal because of its low weight, its harmless handling and especially its storage stability and because of the frequency of its occurrence in the earth's crust. Alumina is suitable as an outstanding transportable energy carrier due to its extreme lattice energy. Heavier metals such as Ga, As, Sn or Zn, or their oxides, are far less easy to transport, and in certain aggregates are environmentally and industrially questionable or even volatile, are rarer, or produce economic creep damage as they rust like iron.

The so-called thermite process, which reduces iron oxide and oxidizes aluminum, has been in use as a welding process for over one hundred years.

It is also known that burning aluminum cannot be extinguished with water because hydrogen gas is formed when the water comes into contact with the aluminum. The use of aluminum to generate hydrogen is also described. However, the metal must first be activated for this purpose, since it is normally protected by an oxide layer. Such a process is disclosed, for example, in WO 2010/076802 A9.

Furthermore, the use of aluminum oxide as an energy store has already been proposed. In a media release dated Sep. 25, 2018, the University of Applied Sciences in Rapperswil (Switzerland) announced that research is being conducted on a solar energy storage system in the form of aluminum. The idea is to use aluminum as a storage medium for solar energy. The energy required to produce aluminum is then to be released again by extracting the chemical energy bound in the aluminum with a high degree of efficiency using a hydrolysis reaction. This produces large amounts of heat and hydrogen. The heat can be used directly, while the released hydrogen can be used, for example, by means of a fuel cell for the production of electricity.

Furthermore, a process for generating thermal energy and carbon monoxide by aluminothermic reduction of carbon dioxide is known from WO 2014/173991 A1. This process is based on the knowledge that aluminum is particularly suitable as an energy carrier and can also be used to convert $CO_2$ to CO.

In addition, ammonia has been proposed as a hydrogen supplier. An overview of the current state of the art is given in an article entitled “Science and Technology of Ammonia Combustion” by Hideaki Kobayashi et al. in Proceedings of the Combustion Institute, 37 (2019), 109-133. When ammonia or other compounds containing nitrogen and hydrogen are used, it is considered a disadvantage that undesirable nitrogen oxides are produced during the reaction and therefore complex multistage processes have to be developed even for combustion power plants.

The present invention is based on the objective to enable the operation of a fused-salt electrolysis plant for aluminum production with renewable energies and to produce basic chemicals at the same time without the inherent loss of dark reaction (night) and melt cooling (aluminum fused-salt electrolysis). The yields of the potential disintegration pathways of carbon dioxide from the melt and a technical applicability were unknown to the skilled person.

A disadvantage in the use of regenerative energies can be seen regionally in the temporal fluctuation of the available electrical power. However, the operation of large-scale production plants in particular requires an energy supply with uniform power. The process according to the invention makes it possible to operate a fused-salt electrolysis plant for aluminum production also with regenerative energies.

It is a further objective of the present invention to combine the operation of a fused-salt electrolysis plant for aluminum production with a highly effective $CO_2$ absorption in order to thereby bind naturally occurring or anthropogenically produced $CO_2$.

Furthermore, the present invention is based as a further objective on linking the operation of a fused-salt electrolysis plant for aluminum production with a generation of basic chemicals for the production of hydrocarbons.

These objectives are solved by a process for generating thermal energy and basic chemicals comprising at least the measures:

a) production of aluminum metal by fused-salt electrolysis in a fused-salt electrolysis plant, preferably by using electricity obtained from renewable energy sources, such as photovoltaic, solar thermal, wind or tidal, b) use of aluminum metal, preferably of a part of the aluminum metal produced, for the generation of thermal energy and of basis chemicals selected from the group carbon monoxide or hydrogen, by bringing carbon dioxide and/or water or a mixture containing a compound containing nitrogen and hydrogen and carbon dioxide and/or water into contact with the aluminum metal and converting it in an aluminothermic reaction to aluminum oxide and carbon monoxide and/or hydrogen, c) storage or chemical conversion of the carbon monoxide and/or hydrogen produced thereby, d) storage of the thermal energy generated in the process or conversion into other forms of energy, and e) recycling the aluminum oxide obtained in the process to the fused-salt electrolysis.

M. S. Vlaskin et al. describe in J. Power Sources, Vol 196, 20, 2011, p 8828-8835 a power generation plant operated with aluminum powder and with water as oxidant. Vlaskin et al. build their pilot plant strictly on the aluminum powder—water to hydrogen—fuel cell strategy. Use of the plant for combined generation of energy and basic chemicals is not disclosed.

Vladimir Shmelev et al. report in Internat. J. of Hydrogen Energy, 41 (2016), 14562-14572 about performing this water vapor reaction on liquid aluminum and show that addition of catalytic minerals (KOH) can increase the oxygen activity and thus the yield to the quantitative optimum. The reaction is carried out in a bubble reactor. Here, the throughput limit is largely limited by the gas bubble rupture as the appearance of the reactant phase at the reactor outlet, which can be adjusted by geometries, parallelization, especially also miniaturizing parallelization (piping, branching) at the reactor design and the critical kinetic parameters such as pressure and temperature. The heating of the bubble reactor and the melting of the aluminum is done by using a furnace.

Reactions of steam with aluminum metal have so far been characterized mainly by the use of furnaces or plasmas to heat the aluminum. The use of the heat of formation of the aluminum oxide during the oxidation of the aluminum combined with the use of the reaction products for the synthesis of basic chemicals has not yet been proposed.

The fact that carbon dioxide and carbon monoxide would be a crucial “Fischer-Tropsch” half-cell reaction on liquid aluminum had escaped the above work, as had a direct route to hydrogen from corresponding nitrogen precursors.

In the process of the invention, flow-through reaction yields and selectivities can be controlled and are governed by timing and local conditions. Particularly elegant is the wide variety in which gas/metal reactants can be targeted for reaction in small and parallel reactor sections.

Optimally, steps a) and b) should be carried out in close proximity to each other, since dissipatory (heat) energy loss can be strongly suppressed in this way.

In principle, however, there is little change in the cycle characteristics of the process if steps b)-d) are carried out after the aluminum has been cooled (nowadays technically typically at further heat exchangers) and moved to another location. Step c) can then after recycling of the resulting aluminia conventionally as pure aluminia returned to the aluminum extraction process, so the melt phase process is a special case particularly favored at the aluminum smelting site.

By using the process according to the invention, an industrially appropriately invested region can become a partially self-sufficient participant in the economic cycle with high energy production and become a polypolistic production and storage site for carbon monoxide or hydrogen and, subsequently, synthetic chemicals extracted or produced therefrom, such as synthetic fuels or propellants.

The method according to the invention brings together, in terms of process technology and capacity logistics, the previous dilemma separation of chaotic-metereological and "planetary" energy pulsation of the power resource and carbon utilization with the help of large-scale invested industries by optimizing the caloric losses.

Incongruence of the potentials of energy production from renewable sources ("supply") and managed demand often leads to the unleashing of primary market forces and the energy market models based on them for electricity, natural gas, oil or coal in the respective politically and regulatory determined market environments typical for the production and use of energy due to their essential role in the functioning of interconnected, industrial economies worldwide.

Politically or tactically set regulations for a partial energy market, often deliberately deviating from actual supply and demand, result on national and supranational energy markets in a risk-adequate return or interest on the assets used for energy production and storage that is no longer perceived as adequate by investors and companies.

This means that important economic triggers for the construction or expansion of $CO_2$-efficient generation/production plants, which are necessary right now, are not set, and intended expansion or savings targets are postponed into the future, thus irrevocably missing their economic and ecological value.

To a large extent, therefore, the complexity of the string, transport and control logic is the decisive barrier to investment, which thus has to contend with non-compensable energy fluctuations and storage buffer mishaps in a purely domestic economy of scale economy. National technology monsters, such as large-scale power plants, promise independence with disproportionate known and unknown risks. Nevertheless, typically decoupling technologies, e.g. of time, information or energy source (electricity/hydrogen) and traction (synthetic diesel, reductive extraction of aviation fuel) are the apparently viable path and of great regional uplift, monopoly cartel liberation and unbundling benefit.

Typical components of a plant for carrying out the process according to the invention are thus, in addition to safety systems, logistics and reservoirs, a classically technical electrolytic gas smelting system, turbines for electricity generation, for example high-pressure water steam turbines, but at the core a thermally coupled reactor volume for the treatment of aluminum, preferably liquid aluminum directly from electrolysis, with $CO_2$ and/or steam or other substantial water sources or with a mixture containing a compound containing nitrogen and hydrogen and carbon dioxide and/or water. These reactions are then exothermic, drive the material production of the refined reaction gases by the energy capacity of the aluminum mass and fill as "pump storage" the nightly energy demand of the e.g. further fired aluminum electrolysis itself.

Detours with large material and energy losses in this e.g. local optimization via e.g. intermediate production of hydrogen or hydrogen derivatives are not necessary.

The recycling of aluminum scrap can also be used for highly efficient regionalization of the process, e.g., in aluminum technology large-scale industrial centers and "urban mining" recycling centers, which themselves often generate electricity with incinerators. Aluminum is inert and available in large quantities. Aluminum is used, for example, in the aerospace and automotive industries. Aluminum waste, typical of metals, is particularly amenable to recycling, unlike synthetic materials, textiles, plastics, microplastics, and other non-environmentally-absorbable, non-biogenic organic chemical compounds.

Aluminum scrap can be used in the form of aluminum powder, aluminum granules, aluminum strips, aluminum wire, aluminum ingots or aluminum hollow bodies, preferably through continuous or discontinuous reactor feeds, optionally using airlocks.

The process according to the invention is characterized by great robustness with respect to the purity of the gas used, due to slag phase separation of non-responsive gas components (saline, mineral). In contrast, other processes, especially those using hydrogen, such as for fuel production or for electricity generation in fuel cells, are particularly dependent on gas purity.

In combination with the material transfer of metallically stored, predominantly regeneratively obtained energy, the process according to the invention can, with the generation of heat by aluminothermic reaction, bring about the targeted reduction of $CO_2$ and/or water and thus the generation of basic chemicals for the production of a wide range of chemicals. The basic chemicals obtained can be further converted in geographical regions other than the original energy production and, due to their availability, can establish local business models up to the international production of value products as well as be used for the production of feedstocks to secure local food supplies.

The generated thermal energy can preferably be supplied to an exploiting consumer. Exploiting consumers can be almost all technical and chemical energy converters. In particular, low-pressure or high-pressure steam turbines for power generation, Stirling engines and other heat engines or direct power generators on temperature gradients, thermolysis reactors, in particular reactors for water thermolysis to hydrogen can be mentioned as exploiting consumers.

The resulting carbon monoxide/hydrogen is stored or fed to a chemical conversion. The generated energy can be dissipated for energy conversion or heat or cold generation, e.g. for heating, by storing it or consuming it directly or indirectly. The thermal energy generated can, for example, be fed to a low-pressure or, preferably, a high-pressure steam turbine in order to generate electricity in this way in a demand-triggered manner.

The oxidation of the aluminum in a closed or flow-through apparatus is particularly preferably carried out by contact with a process clean gas mixture with a predominant flow of carbon dioxide and/or water vapor or by contact with the flow of a mixture containing a compound containing nitrogen and hydrogen and carbon dioxide and/or water. The oxidation of the aluminum preferably occurs in the substantial absence of oxygen gas. Essentially means that the controlled addition of small amounts of oxygen gas, although not optimal, is still possible in principle without affecting the described reaction as such. However, better results are obtained in the absence of oxygen gas. Particularly preferably, therefore, the oxidation of the aluminum takes place in the absence of oxygen gas.

The raw material Aluminum is available as a metallic resource on an industrial scale and represents an alternative to other energy sources. Aluminum is inert and non-hazardous to store and transport. This gives aluminum a significant advantage as an energy source over crude oil, natural gas or coal, which are considered to be much more hazardous to the environment.

The raw material carbon dioxide can be obtained from atmospheric gas, come from combustion processes of all kinds or from other sources and thus be removed from the atmosphere. The claimed process thus has the advantage that no carbon dioxide is produced in the associated energy production, but is in fact consumed. The resulting aluminum oxide is inert and does not lead to any environmental pollution.

In the context of this description, compounds containing nitrogen and hydrogen are inorganic or organic N- and H-containing compounds. These can contain other elements in addition to hydrogen and nitrogen, for example carbon, oxygen or sulfur.

Examples of nitrogen and hydrogen containing compounds are ammonia, urea, hydrazine, amines, imines or amides. Nitrogen and hydrogen containing compounds may be present as polymers, for example polyamides, polyimides or polyurethanes. Preferably, these are low molecular weight compounds. Preferably, ammonia and urea are used, especially ammonia.

The value product spectrum obtained by the process according to the invention is highly congruent. Slagging and polymerizations or oiling are suppressed. Costly catalyst poisoning does not occur.

The variant of the process according to the invention in which compounds containing nitrogen and hydrogen are used in addition to carbon dioxide and/or water has the advantage that only nitrogen and hydrogen and optionally carbon monoxide are formed during the reaction of the compound containing nitrogen and hydrogen. The formation of nitrogen oxides is not observed.

The resulting reaction product of carbon monoxide and/or hydrogen is a hazardous gas. This is diluted when nitrogen and hydrogen containing compounds are used by the nitrogen that is formed at the same time. In addition, extraction, handling and storage of hazardous gases have been readily available for a long time, and especially under current process technologies used in the chemical industry, subject to appropriate safety standards. The risk potential of carbon monoxide and hydrogen is thus on a par with that of other hazardous chemical substances, which, at least at present, is widely accepted scientifically, socially and politically, unlike the risks associated with nuclear energy, for example. The reaction products carbon monoxide and hydrogen can be used advantageously in many industrial processes. These reaction products can be used directly in many industrial processes for the production of energy-rich hydrocarbon compounds, such as for the production of fuels, such as kerosene. Increased use of the process of the invention would provide carbon monoxide and/or hydrogen for industrial purposes. Combustion of hydrocarbons from the reaction products of the carbon monoxide and hydrogen would in turn provide carbon dioxide, which can again be fed to the process according to the invention. The main advantage of the process according to the invention is thus a universal, decentralized and rapidly applicable energy generation, without additional $CO_2$ pollution of the environment caused thereby, whereby the reaction product carbon monoxide can be fed into a material cycle and is combined with the economic cycle medium aluminum/carbon dioxide in a controlled manner.

An interesting component of the process according to the invention is the storage capacity, which increases with the size of the network. This reduces the need for excess capacity by avoiding the buffer and storage measures required for the technical balancing of generation peaks, which entail high costs and high capital commitment. At the same time, excess supply losses can be avoided by using metal-stored energy to produce base chemicals, which in turn can be used to produce base commodities such as fuels, biomasses or food.

The process is net $CO_2$-negative and thus adds value at the source. In addition, the process can be feasible in small units through the use of the metal cycle medium and is therefore also suitable for "urban mining" approaches, for example.

The process can provide additional energy storage capacity on a global scale without unknown risks, the need to build and expand elaborate and safety-critical emergency response, or capital-intensive and geopolitically sensitive gas storage logistics.

The technically and logistically known strand of synthetic fuels can be sustainably preserved for aviation and traction in many areas and regions.

In addition, biomass utilization for sustainable protein and food chain materials is also intensified and the agricultural input is relieved.

The process can be carried out with a minimum of gas purification effort. Energy costs for compression and water preheating can also be minimized, even in large-scale applications.

In step a) of the process according to the invention, aluminum metal is produced by fused-salt electrolysis in a fused-salt electrolysis system. The process of step a) has been known for a long time.

Usually, the Hall-Héroult process is used in aluminum smelters. In this process, alumina is reduced to pure aluminum by means of fused-salt electrolysis. Alumina, which has a melting temperature of 2045° C., is mixed with cryolite to lower the melting temperature to about 950° C. The aluminum produced by electrolysis has a melting point of 650° C.

Electrolysis produces aluminum at the cathode and oxygen at the anode, which is reacted with the carbon of the graphite anode to form carbon dioxide and carbon monoxide. Graphite is also used as the cathode. The liquid aluminum obtained collects at the bottom of the electrolytic troughs and is discharged with suction tubes. This process requires a lot of electrical energy. Therefore, aluminum production is mainly carried out in places where energy is available in sufficient quantities and at low prices. Aluminum smelters cannot be shut down, but must be operated day and night to prevent the metal from solidifying. The operation of conventional smelting electrolysis plants therefore requires a continuous supply of electrical power to the plant.

The process according to the invention makes it possible to use electrical energy from regenerative sources to operate smelting electrolysis plants for the production of aluminum and to at least partially compensate for the power fluctuations that occur.

In step b) of the process according to the invention, aluminum metal is used to generate thermal energy and carbon monoxide or hydrogen. These chemical feedstocks are obtained by oxidation of aluminum by bringing carbon dioxide and/or water or a mixture of nitrogen and hydrogen containing compound and carbon dioxide and/or water into contact with the aluminum metal and reacting it in an aluminothermic reaction to produce aluminum oxide and carbon monoxide or hydrogen.

Step b) can be carried out directly in the fused-salt electrolysis plant by bringing the liquid aluminum metal at the bottom of the system into contact with carbon dioxide or water vapor or a gaseous mixture of nitrogen and hydrogen-containing compound and water vapor and/or carbon dioxide. In addition to the reaction products carbon monoxide or hydrogen, thermal energy is generated which heats up the reaction products and the electrolytic cell. Heating the electrolyte by the reaction heat leads to a saving of electrical energy during electrolysis, since less electricity has to be used to heat the electrolyte. In addition, the reaction heat can be used to keep the electrolyte and metal liquid in the event of a power failure or reduction in the electrical power available for electrolysis, so that the plant does not have to be shut down. This can be used, for example, to bridge downtimes in power generation from renewable sources. However, some of the reaction heat can also be used to generate electricity, for example by passing the gaseous reaction products through one or more turbines for further processing. The electrical power generated can be made available to any consumers or can be used to continue operating the electrolysis in the event of a power failure or reduction in the electrical power available for electrolysis from external sources, so that the plant does not have to be shut down.

Alternatively, step b) can be carried out in a separate reactor located in the vicinity of the fused-salt electrolysis plant. In the reactor, aluminum metal, which is solid or preferably liquid, is contacted with carbon dioxide and/or water vapor or with a gaseous mixture of nitrogen and hydrogen containing compound and carbon dioxide and/or water vapor. When solid aluminum is used, it usually has to be made to react by supplying ignition energy, as described, for example, in WO 2014/173991 A1. Solid aluminum is usually present in finely divided form in order to be able to carry out the desired reaction. In the preferred use of liquid aluminum, separate ignition can be omitted, since the reaction already starts upon contact of the reactants. Preferably, liquid aluminum metal is used in step b), which originates from the fused-salt electrolysis plant in which step a) was carried out.

Also in the variant of step b) with a separate reactor, the reaction heat can be used to keep the electrolyte and the metal in the fused-salt electrolysis system liquid in the event of a power failure or reduction in the electrical power available for electrolysis, so that the system does not have to be shut down. In this variant, too, some of the reaction heat can be used to generate electricity, for example by passing the gaseous reaction products through one or more turbines for further processing. Here, too, the electrical power generated can be made available to any consumers or can be used to continue operating the electrolysis in the event of a power failure or reduction in the electrical power available for electrolysis from external sources, so that the plant does not have to be shut down.

In step b), carbon dioxide or water vapor can be used as oxidant for the aluminum. Alternatively, a mixture of carbon dioxide and water vapor can be used, or carbon dioxide and water vapor can be reacted with the aluminum separately but in one reactor.

Alternatively, in step b), the carbon dioxide and/or water used in the mixture with nitrogen and hydrogen-containing compound can be used as oxidant for the aluminum. Here, too, carbon dioxide and/or water vapor can be used as oxygen-containing compounds together with the nitrogen- and hydrogen-containing compound, or the different reactants can be reacted with the aluminum separately but in one reactor.

In step c) of the process according to the invention, the carbon monoxide generated in step b) and/or the hydrogen generated in step b) is stored or chemically converted. If storage is intended, the thermal energy contained in the reaction products carbon monoxide or hydrogen is fed to an exploitation, for example to the generation of steam by heat exchange. Storage is a suitable option if no suitable reactants or equipment for further processing of the chemical feedstocks are available on site.

Preferably, the carbon monoxide generated in step b) and/or the hydrogen generated in step b) is chemically reacted on site. For this purpose, a variety of chemical reactions are available in which these basic materials can be refined. For example, hydrogen can be used for hydrogenation of organic compounds or in reduction reactions, for example in ammonia synthesis. Carbon monoxide can be reacted with water to form methanol, for example. Preferably, carbon monoxide and hydrogen can be further processed in a Fischer-Tropsch reaction to various organic compounds.

The combined production of carbon monoxide and hydrogen in step b) and the direct further processing of both basic materials in a Fischer-Tropsch reactor is therefore preferred. The heat energy contained in the reactants from step b) can advantageously be utilized in this process.

The thermal energy generated in the aluminothermic reaction in step b) can be stored in step d) or converted into other forms of energy, such as electrical energy. Variants of step d) have been described above. Alternatively, the thermal energy generated can be used for heating or cooling purposes.

The alumina obtained by the aluminothermic reaction is recycled to fused-salt electrolysis (step e). It is possible to feed the alumina into the fused-salt electrolysis system in which step a) has already been carried out. However, it is also possible to introduce the alumina produced in step e) into a different fused-salt electrolysis system than the one in which step a) was carried out.

In the variant in which step b) was carried out in the fused-salt electrolysis plant of step a), the alumina is formed directly in the plant, so that automatic recycling takes place.

Preferred is a process in which at least part of the thermal energy released by the aluminothermic reaction in step b) is used to generate electrical energy.

Also preferred is a process in which at least part of the thermal energy released by the aluminothermic reaction in step b) is used to heat the electrolyte and/or the aluminum in the fused-salt electrolysis plant.

Particularly preferred is a process in which the fused-salt electrolysis plant is operated using intermittently fluctuating or intermittently absent electrical energy from an external source, and in which at least a portion of the thermal energy released by the aluminothermic reaction in step b) is used to keep the electrolyte and/or the aluminum liquid in the fused-salt electrolysis plant.

Also particularly preferred is a process in which the fused-salt electrolysis plant is operated using intermittently varying or intermittently absent electrical energy from external sources, and in which at least a portion of the electrical energy generated is used to reduce or compensate for the variation or absence of electrical energy supplied from external sources.

Most particularly preferred is a process in which both carbon monoxide and hydrogen are generated in step b), which are subsequently chemically reacted with each other in a Fischer-Tropsch reaction.

Also very particularly preferred is a process in which the alumino-thermal reaction in step b) is carried out by bringing carbon dioxide and/or water vapor into contact with liquid aluminum metal.

Furthermore, very particularly preferred is a process in which the alumino-thermal reaction in step b) is carried out by contacting a mixture of nitrogen and hydrogen-containing compound and carbon dioxide and/or water with liquid aluminum metal.

Mixtures of ammonia/water, ammonia/carbon dioxide or ammonia/water/carbon dioxide are particularly preferred here.

In this process variant with liquid aluminum metal, the ignition of the reaction mixture customary in thermite processes can be omitted, since the reaction mixture already has such a high energy content that the reaction starts directly on contact of the reactants. Of course, separate ignition can also be carried out in this process variant.

Surprisingly, it was found that compounds containing carbon dioxide and/or water vapor and/or nitrogen and hydrogen can be reduced even more efficiently to the CO or H2 intermediate in contact with liquid aluminum metal without further disintegration into their components.

The advantage of this process variant is particularly the use of the liquid aggregate state, of a controllable dynamics and basic activation of the gas-liquid phase boundary.

Thus, existing plants can be connected online and designed in safe scaling of the reaction chambers. Cascade circuits for enrichment and depletion are conceivable; "numbering" and parallelization in the sense of mini- or micro-system technology also make affordable and finely controllable plants possible. Start-up and shut-down as well as expensive catalysts and their activation protocols can be omitted once the system is trimmed, since the aluminum half-cell itself is a highly regulated buffered system.

In a particular embodiment, the process according to the invention in which carbon monoxide is generated is coupled with a hydrogen generation process. This can be any process, such as water electrolysis or aluminothermic reaction of aluminum metal with water vapor. Again, the relatively low specific and molar enthalpy shows the clear driving force of the described aluminothermic water reduction for hydrogen production.

Modern industrial plants avoid cooling processes without energy utilization. The storage of aluminum in itself would represent a considerable energy loss for the process according to the invention, since aluminum is also cooled further with losses after hardening from the melt. Thus, the use of steam for feed is also advantageously part of the thermal system coupling. In a special case, the aluminum phase can be kept liquid during water feed and exothermic reduction, i.e., the evaporation unit would then only be necessary for the turbine circuit.

The invention also relates to a process for the generation of thermal energy and carbon monoxide by aluminothermic reaction of carbon dioxide, in which aluminum metal and carbon dioxide are reacted and converted to alumina and carbon monoxide, the process being characterized in that gaseous carbon dioxide and liquid aluminum metal are brought into contact with each other until a gaseous and carbon monoxide-containing reaction product is formed, preferably with a carbon monoxide content of at least 30% by volume.

The invention also relates to a process for the generation of thermal energy and hydrogen by aluminothermic reaction of water vapor, in which aluminum metal and water vapor are reacted and converted to alumina and hydrogen, the process being characterized in that water vapor and liquid aluminum metal are brought into contact with each other until a gaseous and hydrogen-containing reaction product is formed, preferably with a hydrogen content of at least 30 percent by volume.

The invention also relates to a process for generating thermal energy and hydrogen by aluminothermic reaction of a mixture of nitrogen and hydrogen-containing compound with steam and/or carbon dioxide, in which aluminum metal and the compounds contained in the mixture are reacted to form alumina, nitrogen and hydrogen, the process being characterized in that the compounds contained in the mixture and liquid aluminum metal are brought into contact with one another until a gaseous and hydrogen-containing reaction product, preferably with a hydrogen content of at least 30 percent by volume, has been formed.

These process variants using liquid aluminum metal can preferably be carried out in liquid metal reactors known per se. Particular preference is given to the use of corundum frits and corundum components for the gas inlet and outlet as the liquid contact bottom, since this material also corresponds to the reactants (Int. J. Hydrogen Energy Vol 41, Issue 33, 7 2016, p 14562-14572).

Finally, the invention relates to the use of liquid aluminum metal for the production of thermal energy and carbon monoxide and/or hydrogen by aluminothermic reaction of carbon dioxide and/or of water or of a mixture containing nitrogen and hydrogen containing compound and carbon dioxide and/or water.

Very preferred is a process in which liquid aluminum is contacted at a temperature >660° C. with metered gaseous carbon dioxide or water vapor or gaseous mixture containing nitrogen and hydrogen-containing compound and carbon dioxide and/or water vapor to obtain an educt mixture with a CO content or with an $H_2$ content of more than 30 vol. %, preferably more than 50 vol % and particularly preferably more than 66 vol %, by controlling partial pressures and residence time at the aluminum contact by contact length and/or contact duration.

The aluminothermic reaction in step b) of the process according to the invention can be carried out in the presence or preferably in the absence of oxygen gas.

In a further preferred embodiment of the process according to the invention, the carbon dioxide used originates from combustion processes or is obtained from the atmosphere or seawater.

The following example explains the invention without limiting it thereby.

EXAMPLE

Aluminothermic Reduction of Carbon Dioxide on Liquid Aluminum

Within the framework of a feasibility study, the reductive behavior of liquid aluminum towards carbon dioxide and the reaction products formed in the process are to be investigated. A condition for carrying out the aluminothermic reaction should be that it takes place in a closed apparatus in a carbon dioxide stream. The gases released during the reduction of the carbon dioxide were collected in a PTFE gas bag and were analyzed by gas chromatography.

The experimental or reaction apparatus consisted of a quartz tube with ceramic furnace. Liquid aluminum was oxidized with pure carbon dioxide ($CO_2$, GA 370) in a specially made quartz tube (dimensions: approx. 60 cm length 8 cm diameter) under controlled heating in a ceramic furnace. For this purpose, mg quantities of aluminum were liquefied in the quartz tube. After purging with nitrogen, carbon dioxide was passed over the molten aluminum at a flow rate of about 100 ml/minute. In a strong exothermic reaction, spontaneous ignition of the aluminum occurred, which lasted for about 15 seconds and did not extinguish until the aluminum was apparently converted.

During the self-ignition phase, an aliquot of the escaping gas stream was collected in a PTFE gas bag (Grace PTFE sampling bag, Art. 8605719) and the qualitative and quantitative composition of the reaction gas mixture was subsequently analyzed by gas chromatography. In comparison, an aliquot of the gas stream was taken as a blank before heating the aluminum and the composition was also analyzed by gas chromatography (GC).

GC measurement parameters

Stationary phase: Molecular sieve 5 Å

Carrier gas: Helium 4.6, Messer Griesheim

Carrier gas control: flow controlled

Column flow [ml/min]: 20

Injector temperature [° C.]: 150

Detector type: WLD

Detector temperature [° C.]: 150

Oven temperature [° C.]: 80

Injection volume [μL]: 250

Result

In the collected gas mixture >33% carbon monoxide was determined.

Even with undercoating at the analytical frit, CO partial pressure was immediately indicated by the instrument.

The invention claimed is:

1. A process for generating thermal energy and basic chemicals comprising at least the steps:

a) producing aluminum metal by fused-salt electrolysis in a fused-salt electrolysis plant, b) using liquid aluminum metal for the generation of thermal energy and of chemical basic materials selected from the group consisting of carbon monoxide and hydrogen, by bringing carbon dioxide and/or water or a mixture containing a compound containing ammonia and carbon dioxide and/or water vapor into contact with the liquid aluminum metal and converting it in an aluminothermic reaction to aluminum oxide and carbon monoxide and/or hydrogen, which step b):

b1) is performed in the fused-salt electrolysis plant by bringing the liquid aluminum metal at the bottom of the system into contact with carbon dioxide and/or water vapor or a gaseous mixture of nitrogen and hydrogen containing compound and water vapor and/or carbon dioxide, or b2) is performed in a separate reactor by contacting liquid aluminum metal with carbon dioxide and/or water vapor or with a gaseous mixture of nitrogen and hydrogen containing compound and carbon dioxide and/or water vapor with omission of separate ignition of the liquid aluminium metal, c) storage or chemical conversion of the carbon monoxide and/or hydrogen produced thereby, d) storage of the thermal energy generated in the process or conversion into other forms of energy, and e) recycling the aluminum oxide obtained in the process to the fused-salt electrolysis.

2. The process according to claim 1, wherein in step b) carbon dioxide and/or water is brought into contact with the liquid aluminum metal.

3. The process according to claim 1, wherein the liquid aluminum metal used in step b) has been partially produced in the fused-salt electrolysis system in which step a) was carried out.

4. The process according to claim 1, wherein at least part of the thermal energy released by the aluminothermic reaction is used to generate electrical energy.

5. The process according to claim 1, wherein at least part of the thermal energy released by the aluminothermic reaction is used to heat the electrolyte and/or the aluminum in the fused-salt electrolysis plant.

6. The process according to claim 1, wherein the fused-salt electrolysis plant is operated using intermittently fluctuating or intermittently absent electrical energy from an external source, and wherein at least part of the thermal energy released by the aluminothermic reaction is used to keep the electrolyte and/or the aluminum liquid in the fused-salt electrolysis plant.

7. The process according to claim 3, wherein the fused-salt electrolysis plant is operated using intermittently fluctuating or intermittently absent electrical energy from an external source, and wherein at least part of the electrical energy generated is used to reduce or compensate for the fluctuation or absence of electrical energy supplied from external sources.

8. The process according to claim 1, wherein in step b) both carbon monoxide and hydrogen are produced, which are subsequently chemically reacted with one another in a Fischer-Tropsch reaction.

9. The process according to claim 1, wherein the aluminothermic reaction is carried out by bringing carbon dioxide and/or water vapor or a gaseous mixture comprising a compound containing nitrogen and hydrogen and carbon dioxide and/or water vapor into contact with the liquid aluminum metal.

10. The process according to claim 9, wherein the aluminothermic reaction is carried out by bringing carbon dioxide and/or water vapor into contact with the liquid aluminum metal.

11. The process according to claim 9, characterized in that the aluminothermic reaction is carried out by bringing a gaseous mixture containing ammonia and carbon dioxide and/or water vapor into contact with the liquid aluminum metal.

12. The process according to claim 9, wherein gaseous carbon dioxide and liquid aluminum metal are brought into contact with each other until a gaseous reaction product with a carbon monoxide content of at least 30% by volume is formed, or wherein water vapor and liquid aluminum metal are brought into contact with each other until, until a gaseous reaction product with a hydrogen content of at least 30% by volume is formed, or wherein a gaseous mixture containing ammonia and water vapor and/or carbon dioxide and liquid aluminum metal are brought into contact with one another until a gaseous reaction product with a hydrogen content of at least 30% by volume is formed.

13. The process according to claim 12, wherein liquid aluminum is brought into contact at a temperature >660° C. with metered gaseous carbon dioxide or water vapor or with metered gaseous mixture of ammonia and carbon dioxide and/or water vapor to obtain a reactant mixture with a CO content or with an $H_2$ content of more than 30 vol. % by controlling partial pressures and residence time at the aluminum contact by contact length and/or contact duration.

14. The process according to claim 12, wherein liquid aluminum is brought into contact at a temperature >660° C. with metered gaseous carbon dioxide or water vapor or with metered gaseous mixture of ammonia and carbon dioxide and/or water vapor to obtain a reactant mixture with a CO content or with an $H_2$ content of more than 66 vol. % by controlling partial pressures and residence time at the aluminum contact by contact length and/or contact duration.

15. The process according to claim 1, wherein the aluminothermic reaction takes place in the absence of oxygen gas.

16. The process according to claim 1, wherein the carbon dioxide used originates from combustion processes or is obtained from the atmosphere or seawater.

17. The process according to claim 1, wherein the reactor used in step b2) is located in the vicinity of the fused-salt electrolysis plant used for step a).

18. The process according to claim 1, wherein in step b) carbon dioxide or a mixture containing a compound containing nitrogen and hydrogen and carbon dioxide and/or water are reacted with said liquid aluminum metal resulting in aluminum oxide and carbon monoxide or in aluminium oxide and carbon monoxide and hydrogen.

19. A process for the production of thermal energy and carbon monoxide and hydrogen by aluminothermic reaction of carbon dioxide and water or of a mixture containing ammonia and carbon dioxide and/or water vapor which comprises utilizing a liquid aluminum metal.

* * * * *